United States Patent [19]

Price

[11] Patent Number: 4,741,235

[45] Date of Patent: May 3, 1988

[54] APPARATUS FOR SPLICING BELT

[76] Inventor: John G. Price, P.O. Box 17689, Montgomery, Ala. 36117

[21] Appl. No.: 883,651

[22] Filed: Jul. 9, 1986

Related U.S. Application Data

[62] Division of Ser. No. 737,255, May 23, 1985, Pat. No. 4,671,834.

[51] Int. Cl.$^4$ .......................... B26D 3/28; B26D 5/10
[52] U.S. Cl. .......................................... 83/870; 83/452; 83/574; 83/614; 83/821
[58] Field of Search .................. 83/454, 455, 462, 465, 83/565, 581, 614, 821, 824, 870, 875, 574, 452

[56] References Cited

U.S. PATENT DOCUMENTS

| | | | |
|---|---|---|---|
| 218,653 | 8/1879 | York | 83/455 |
| 868,656 | 10/1907 | Gramelspacher | 83/455 |
| 3,543,627 | 12/1970 | Hearns | 83/455 |
| 3,964,360 | 6/1976 | Schwartz | 83/464 |

Primary Examiner—E. R. Kazenske
Assistant Examiner—Hien H. Phan
Attorney, Agent, or Firm—Sherman and Shalloway

[57] ABSTRACT

The present invention relates to an apparatus for splicing a belt which includes a base to which the belt end is mounted, a holding device which is slidably mounted to move in a direction oblique to the longitudinal direction of elongation of the belt and cutting member means mounted on the holding device. In the preferred embodiment, the cutting member comprises a knife which may be attached to the holding device in one of two orientations, a first orientation of which is designed to enable the knife to trim off the belt end, and the second orientation of which is designed to enable the knife to split the belt end between the plies thereof. In the second orientation, the holding device includes a stepped configuration allowing the knife to be clamped at any one of a number of different elevations so that the splitting procedure may accurately be carried out between the desired plies.

8 Claims, 4 Drawing Sheets

APPARATUS FOR SPLICING BELT

This is a division of application Ser. No. 737,255, filed May 23, 1985, now U.S. Pat. No. 4,671,834.

BACKGROUND OF THE INVENTION

This invention relates to a belt splice and a method of splicing a belt. In the prior art, numerous belt splicing techniques and belt splices formed thereby are known. For example, early belts were made from leather which was spliced together through the use of glue and a splice interface angled with respect to the longitudinal axis of the belt at a small acute angle so as to increase the surface area of glue contact. Later, cotton fabric belts were made by calendering rubber into the fabric and stacking the fabric plies together to form a strong belt. In this technique, a stepping of the mating edges of the belt was used to enhance the connection. Both of these examples of prior art splicing methods and splices formed thereby may be catologued as bonding methods of splicing. Additionally, mechanical splicing methods have been used as well as combinations of mechanical and bonding methods of splicing.

In the mechanical catagory of splices, often, the interface area is fitted with an elongated hinge in an attempt to render the splice flexible in the direction transverse to the longitudinal direction thereof. This technique requires the introduction into the splice of the hinge pin which not only causes shock and strain in the belt when it passes over the conveyor pulleys but which hinge pin is also easily and rapidly worn by the inherent flexing which takes place at the hinge pin during its movement between flat and curved regions of the conveyor system. A further limitation of the hinge-type splice lies in the fact that the joint must be applied to the belt at precisely a right angle to the elongation of the belt since otherwise the belt would be distorted when forced to move over a curved surface such as a pulley.

A further mechanical splicing means comprises the embedding within the faces of the belt ends of a solid steel plate. Although this is an improvement in other designs due to the lack of metallic or other elements on the belt surfaces, this splicing device has limited application because it causes the belt to have a flat spot at the area of the splice even when the belt splice is going around a pulley, thereby causing extreme stress to be placed upon the spliced area.

Sometimes, the flat plate approach is augmented by bolts or rivets which extend completely through the belt and the plate on both sides of the splice. When these techniques are employed, the splice is optimized by grinding down portions of the metallic fasteners which arise above the belt surfaces. This grinding procedure, which is necessary to ensure avoidance of unfavorable interactions with the conveyor equipment, results in basic weakening of the fasteners. Furthermore, the inclusion of fasteners at the splice act to concentrate the belt pull forces at the fastener sites, thereby resulting in high levels of belt stress thereat. These high stress concentrations may be somewhat reduced through the utilization of a large number of fasteners, however, this adds time and expense to the splicing process.

Another type of splice consists of a stepped splice which is mostly used in belts having several layers bonded together. This type of splice is extremely time consuming and expensive to make because due to the high adhesion between belt layers, mechanical equipment must be used to pull the belt apart at the various layers. Very often, the rubber layers fail to strip off at exactly the bonded surfaces thereby leaving patches of rubber which must be ground away thereby damaging the fabrics contained between the layers. No way has yet been devised to accurately grind away these rubber patches without damaging the fabrics and thus the stepped method and step splice has severe limitations.

The following prior art is known to applicant:

U.S. Pat. Nos. 1,250,958 to Brooks discloses a belt fastener including a metal plate placed within split portions of the facing belt ends which plate is secured to the ends through the use of a plurality of rivets extending therethrough. The deficiencies of this solid metallic plate have been discussed hereinabove as have the deficiencies of metallic fasteners.

U.S. Pat. Nos. 1,421,036 and 1,428,917 both to Snyder are similar to Brooks as utilizing solid metal plates embedded within the belt and fastened thereto through the use of rivets. The main difference between the Snyder patents lies in the flat nature of the plate of Snyder '036 and the curved nature of the plate in Snyder '917.

U.S. Pat. No. 1,792,718 to Stoll discloses a belt splice utilizing a ribbon of metal or other material having a relatively high tensile stress inserted within slits in the belt ends and fastened thereto through the use of rivets. Thus, the limitations of Stoll are similar to those discussed with respect to the patents discussed hereinabove.

U.S. Pat. No. 3,076,736 to McHugh discloses a belt formed with tubular strength elements longitudinally therein which accept auxilliary splice elements along with adhesive or vulcanization to secure ends of the belting together. Since the McHugh belt requires the tubular strength elements, McHugh's splice is not usable with other types of belts. Furthermore, the tubular elements are completely different both structurally and functionally from the metallic fabric device of Applicant.

U.S. Pat. No. 3,224,566 to Elliot exemplifies the stepped splice discussed hereinabove and is believed different from the present invention as requiring a joining member of a non-metallic fabric while also requiring very difficult cuts in the belt ends so as to provide the stepped configuration thereof.

U.S. Pat. No. 4,376,668 to Ginter, Jr., et al. discloses a splice utilizing a pair of splice members made of a non-metallic fabric which are fastened within the belt ends through the use of nails disclosed as being made of, for example, rigid nylon or metal. This teaching is believed to be similar to the fastener teachings of Brooks, Snyder and Stoll as discussed hereinabove. Although the splice members of Ginter, Jr., et al. are flexible, the nail fasteners cause problems in concentration of forces as well as interference with conveyor components as described hereinabove. While the splice elements of Ginter, Jr., et al. are disclosed as being of a flexible nature, their strength is limited since they are not made of metal but rather are disclosed as being made of a material such as nylon fibers having a rubber-like or elastomeric material bonded to the surfaces thereof.

SUMMARY OF THE INVENTION

The present invention overcomes the deficiencies and limitations of prior art methods and splice constructions by simplifying the actual splice in its structure to thereby also simplify the method of splicing. The inventive splice and method of splicing are embodied in the following unique combination of features:

(a) In the preferred embodiment of the present invention, the splice is accomplished by cutting the belt at an acute angle to the longitudinal extent thereof through the use of a jig.

(b) This jig is also used to slit each end of the belt between the plies thereof to the depth required so as to enable insertion of a splice piece.

(c) The splice piece in the preferred embodiment consists of a single ply of wire fabric such as that which is used in steel belted radial tires, however, when the inventive splice is being applied to an extremely heavy conveyor system belt, a splice made up a plurality of layers of wire fabric may be utilized. Further, if desired, the splice piece could be made from a fiber fabric such as, for example, nylon fabric such as that which is used in fabric bias ply tires.

(d) In a preferred embodiment, the splice piece is made from twisted wire cables previously calendered with high-tensile natural rubber compounds and cut precisely at the prescribed angle for accurate installation. When viewed from above, the multiple ply splice piece comprises a network of diamond-shaped figures which cushion belt tensions through their elongation as longitudinal loads on the belt attempt to move the cables forming the splice piece into parallel alignment with the direction of travel of the belt.

(e) After the splice piece is appropriately inserted into the cuts made in the belt ends, fresh rubber is inserted where necessary into any depressions which may be evident at the region of the splice.

(f) Then, without the use of any further fasteners, the splice is vulcanized during a single vulcanizing operation which results in a splice of great simplicity and strength. It is contemplated that the splice of the present invention when properly formed will be no longer than one foot long in the direction of elongation of the belt.

Accordingly, it is a first object of the present invention to provide a belt splice and a method of splicing a belt which are much simpler and more effective than prior art splices and methods.

It is a further object of the present invention to provide a belt splice which requires no additional fasteners over and above an easily inserted splice piece.

It is a further object of the present invention to provide a belt splice which in its most basic form may be accomplished with only three simple cuts being made to a previously unspliced belt. It is a yet further object of the present invention to provide a belt splice which is accomplished solely through a single vulcanization procedure.

It is a yet further object of the present invention to provide a belt splice which maintains virtually the same flexibility at the region of the splice as exists throughout the rest of the conveyor belt thereby causing smooth continuous motion of the conveyer belt in use and avoidance of wear and tear as well as avoidance of shocks.

These and other objects, aspects and features of the present invention will be better understood from the following specific description of the preferred embodiments when read in conjunction with the appended drawing figures.

SPECIFIC DESCRIPTION OF THE PREFERRED EMBODIMENTS

Figure 5:
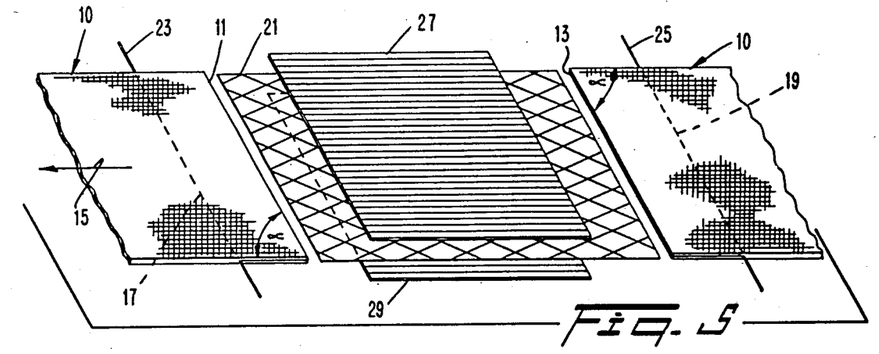
FIG. 5 shows an exploded view of a splice area of the belt shown in FIGS. 1 and 2.
Figure 6:
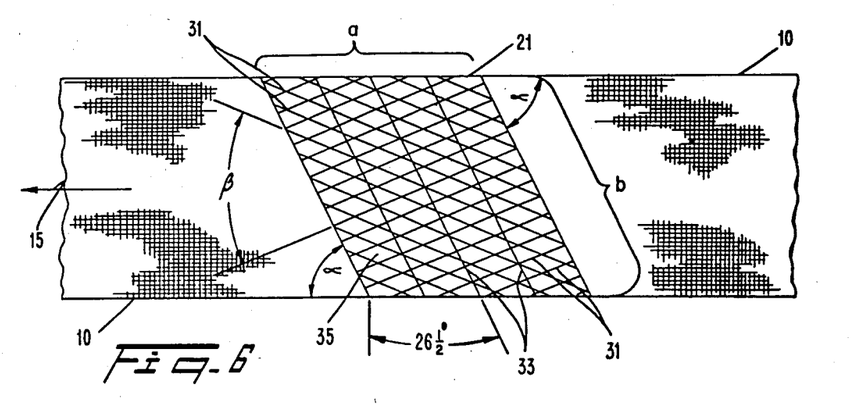
FIG. 6 shows a view similar to the view of FIG. 5 but showing more details of the particular splice material.

With reference first to FIGS. 5 and 6, the specific details of the actual splice will be described. As shown in the exploded view of FIG. 5, the splice includes a belt 10 which is split at an interface 11, 13 at an acute angle $\alpha$ to the longitudinal axis thereof which is shown by the arrow designated by reference numeral 15. It is believed to be advantageous to provide the interface surfaces 11 and 13 at an acute angle because this increases the length of the joint over what it would be if the angle $\alpha$ were 90° to thereby increase the area of vulcanization at the interface 11, 13 which is believed to increase the strength of the splice. Also the angular interface causes the splice area to roll over the conveyer belt pulleys smoothly and gradually.

As further shown in FIG. 5, slits are formed in the respective interfaces 11 and 13 of the belt 10 to a depth therein as shown by the respective dotted lines 17 and 19.

In the preferred embodiment, as shown in figure 5, a splice piece 21 is provided which in assembly is inserted into the above described slits as far as it may be inserted. In the preferred embodiment, the width of the splice piece 21 in the longitudinal direction 15 is specifically designed to be slightly less than the distance between the lines 17 and 19 when the interfaces 11 and 13 are in engagement with one another. As also shown in FIG. 5, respective strings 23 and 25 are inserted in the above described slits and in engagement with the ends thereof as represented by the lines 17 and 19 which strings 23 and 25 aid in the dispersion of vapors which are created by the vulcanization method step described hereinbelow and used in splicing the belt 10.

In order to enhance the strength of the splice, the rubber covers of the belt may be removed for the purpose of replacing them with fresh unvulcanized rubber prior to the vulcanization step. If such a procedure is to be followed, as will be explained in greater detail hereinafter, non-metallic open-weave fabric strips 27 and 29 are respectively laid over the top and bottom surfaces of the belt 10 and are then covered by the above described fresh unvulcanized rubber. This procedure will be explained in greater detail with reference to FIGS. 7 and 8.

The specific details of the two ply splice material 21 are better understood with reference to FIG. 6. As shown therein, the splice material 21 may be made of a multiple layer wire fabric carefully prepared from twisted wire cables which have been previously calendered with high-tensile natural rubber compounds and which have been precisely cut at prescribed angles. As seen in FIG. 6, the splice piece 21 has a width dimension designated by the letter a and a length diagonally across the width of the belt which is designated by the letter b. The dimension b is angled with respect to the longitudinal axis 15 of the belt 10 at the angle α. The width dimension a is specifically designed to be slightly smaller than the distance between the lines 17 and 19 shown in FIG. 5 when the interface surfaces 11 and 13 are engaging one another.

With further reference to FIG. 6, it is seen that the wire fabric as described above is comprised of a plurality of twisted wire cables designated by the reference numerals 31. If desired, to enhance the strength of the fabric 21, lengthwise cables 33 may be provided which are parallel to the length dimension b. As shown in figure 6, the cables 31 are woven together in such a manner that respective crossing cables 31 make an angle β with respect to one another which is of a predetermined nature. As seen in FIG. 6, when the fabric 21 is cut in the configuration shown, the cables 31 which cross one another form equal angles on opposite sides of the longitudinal axis 15. Thus, when the belt 10 is spliced in accordance with the present invention, forces acting thereon which tend to stretch the belt 10 in a longitudinal direction thereo are resisted by uniform elongation of the splice piece 21 through elongation of the diamond shapes 35 formed in the fabric 21 by the crossing of the cables 31 as explained hereinabove.

The angle α may, if desired, be any desired acute angle. In the preferred embodiment of the present invention, the angle α has been chosen to correspond to the arc tangent of 2, which is approximately 63.43°. This particular angle has been chosen because it may easily be formed by constructing a right triangle with perpendicular sides one of which is twice as long as the other and with the hypotenuse of the triangle forming the angle α with the shorter side. In this light, the above described dimensions make it easy for one skilled in the art to construct a jig to perform the various cuts including the cut which forms the interfaces 11 and 13 at the angle α with the longitudinal axis 15 of the belt. Again, it is stressed, that any acute angle α may be utilized in cutting the belt 10. Another reason for the choice of an acute angle is the fact that the angular nature of the interface 11, 13 will cause the belt 10 when spliced in accordance with the present invention to roll over the conveyor pulleys in a gradual manner across the belt rather than in the sudden fashion which would occur were the angle α to be 90°.

Figures 9, 10:
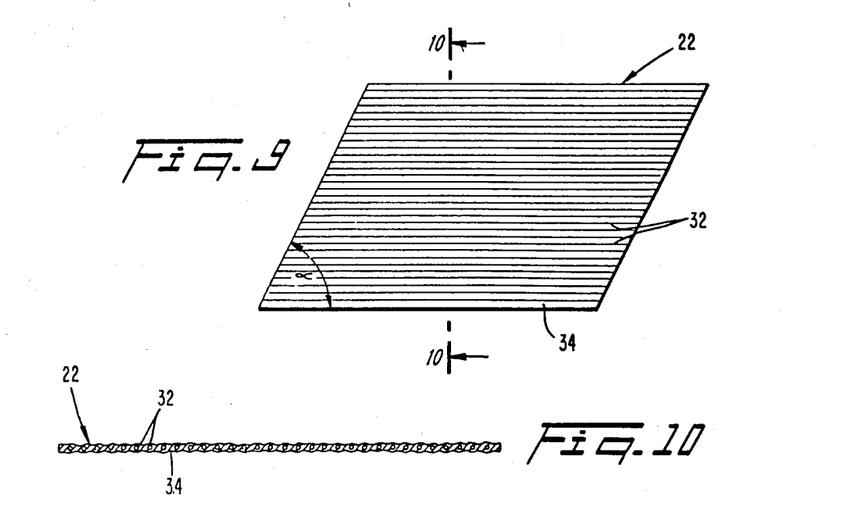
FIG. 9 shows a top view of an alternative form of the splice piece made of a single ply.
FIG. 10 shows a cross-sectional view along the line 10—10 of FIG. 9.

The splice piece 21 shown in FIGS. 5 and 6 may be described as a 2-ply splice piece in that it includes two layers formed by the crossed cables 31. If desired, in lighter applications, a single ply wire fabric 22 may be employed as shown in FIGS. 9 and 10 which would consist of a plurality of cables 32 laid adjacent to one another in parallel relation so that in the configuration of the splice piece as shown for example in FIG. 6, these cables 32 would all be parallel to the longitudinal axis 15 of the belt 10. When such a single ply splice piece is utilized, the parallel cables are embedded in a rubber pad 34 so as to ensure the integrity of the structure thereof.

While the splice piece 21 has been described above as being made of a wire fabric such as that which is used in steel belted radial tires, if desired, for reasons of added flexibiity and in lighter applications the splice piece may be made of a non-metallic fabric such as that which is used in fabric bias play tires. One example of such a fabric is made of a nylon weave.

Figure 7:
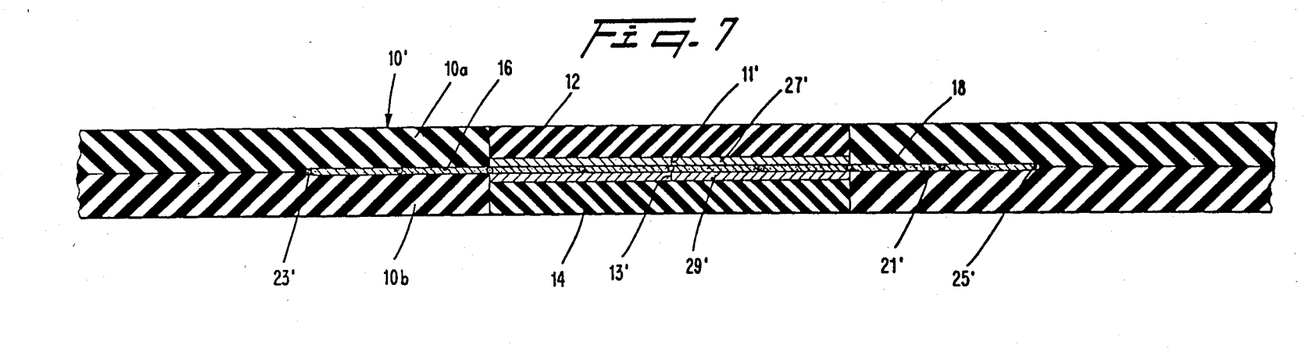
FIG. 7 shows a cross-sectional view through the spice area of a belt having even numbers of plies.
Figure 8:
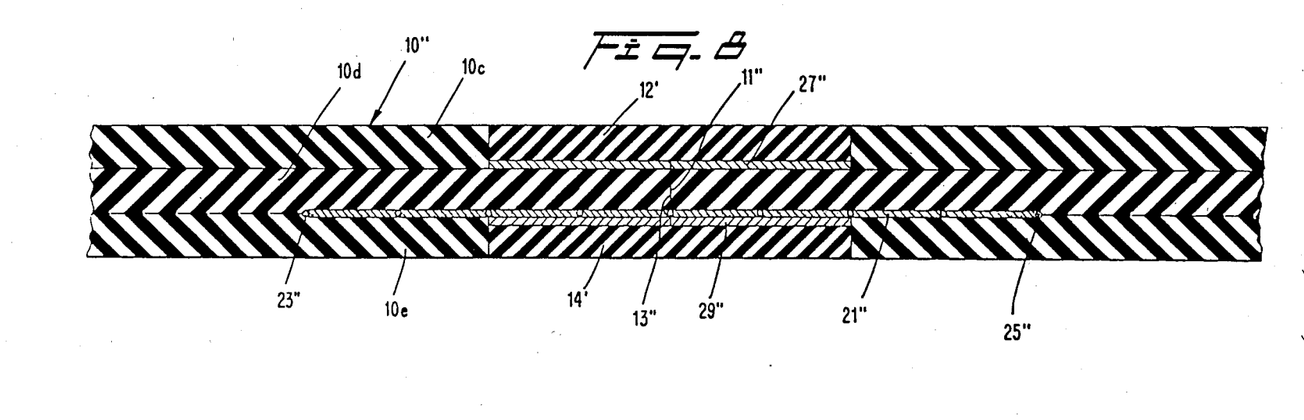
FIG. 8 shows the splice area of a belt having odd numbers of plies.

With reference now to FIGS. 7 and 8, the present invention will be explained in conjunction with belts of even and odd numbers of plies. Firstly, with reference to FIG. 7, a cross-sectional view along the longitudinal axis of a belt 10′ having an even number of plies is shown. The belt 10′ has a top ply 10a and a bottom ply 10b. Although the belt 10′ only has two plies, the teachings of the present invention as applied to a two-ply belt are equally applicable to any belt of even number plies such as 4, 6 etc. As shown, the belt 10′ has been sliced, at the interface designated by reference numerals 11′ and 13′. Furthermore, the belt 10′ has been sliced in the longitudinal direction as designated by reference numerals 16 and 18 which allows the insertion of the splice piece 21′. Also shown in FIG. 7 are the strings 23′, 25′, the purpose of which having been described in detail hereinabove with regard to figure 8, and also shown in FIG. 7 are the open weave fabric pieces 27′ and 29′ the significance of which having also been described with reference to FIG. 8. In splicing a belt with even plies such as the two-ply belt 10′ of FIG. 7, the plies are slit in the longitudinal direction between the middle two plies, which in this case are also the outer two plies.

As also shown in FIG. 7, the outermost plies which in this case are the sole plies 10a and 10b may be removed from the belt 10′ a short distance to each side of the interface designated by reference numerals 11′ and 13′. While this is an optional procedure, when it is performed, fresh rubber splines 12 and 14 are inserted into the openings vacated by the removed strips and during the vulcanization process, the splines 12 and 14 become integrated into the belt 10′.

With reference now to FIG. 8, it seen that a belt 10″ having an odd number of plies is shown. In particular, the belt 10″ includes three plies, 10c, 10d and 10e. In a similar manner to the belt 10′ shown in FIG. 7, the belt 10″ of FIG. 8 also includes a splice piece 21″, strings 25″ and 23″, open weave fabric pieces 27″ and 29″ as well as fresh rubber splines 12′ and 14′ which replace strips of the outer plies 10c and 10e respectively which have been removed adjacent the interface 11″, 13″ during an optional aspect of the splicing procedure. When a belt such as the belt 10″ having odd numbers of plies is to be spliced, the plies in the preferred embodiment, are slit between the center ply, in this case the ply 10d, and the next ply toward the drive cover side, which is the side of the belt facing inwardly and away from the surface which is utilized to transport the items for which the conveyor belt 10″ has been provided.

The particular details of the inventive splice having been described, it is believed appropriate to begin a discussion of the actual method of splicing by describing the particular details of the apparatus consisting of several interrelated elements which is utilized to perform the actual splice. In this light, reference is now made to FIGS. 1-4 wherein are illustrated the particulars of the apparatus utilized to splice a belt.

Figure 1:
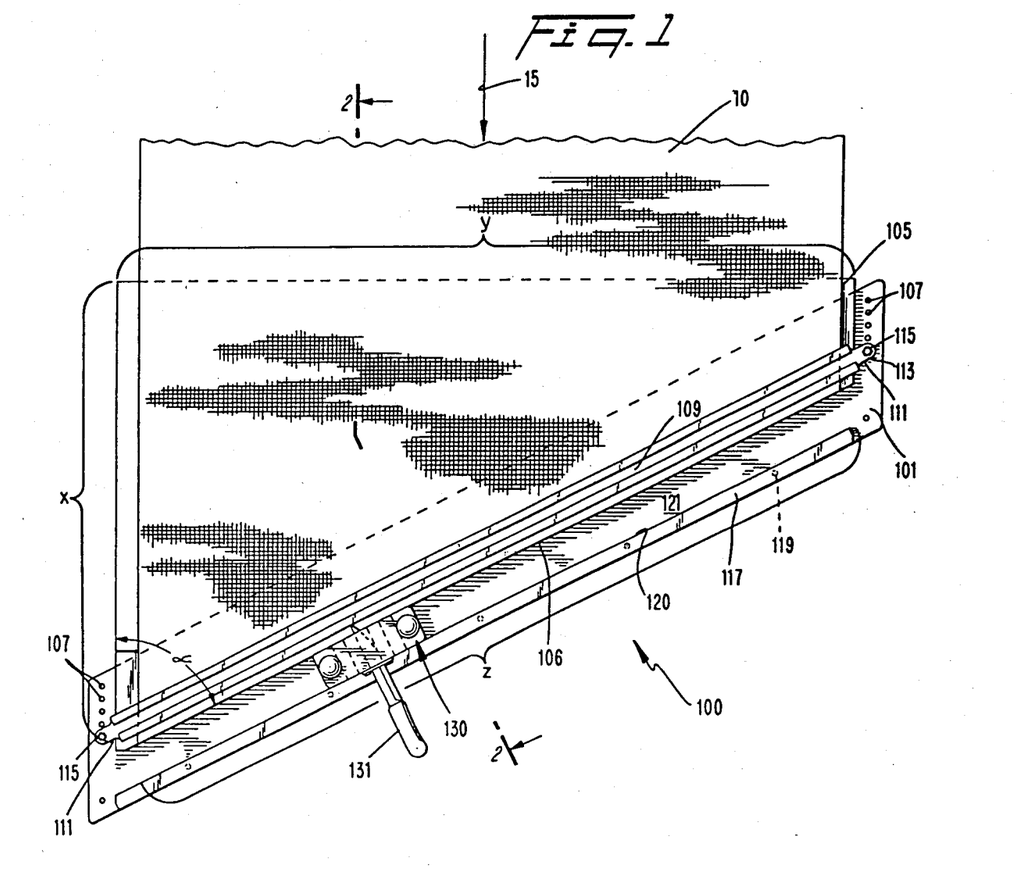
FIG. 1 shows a top view of an apparatus utilized to splice a belt shown in conjunction with a belt to be spliced thereby.
Figure 2:
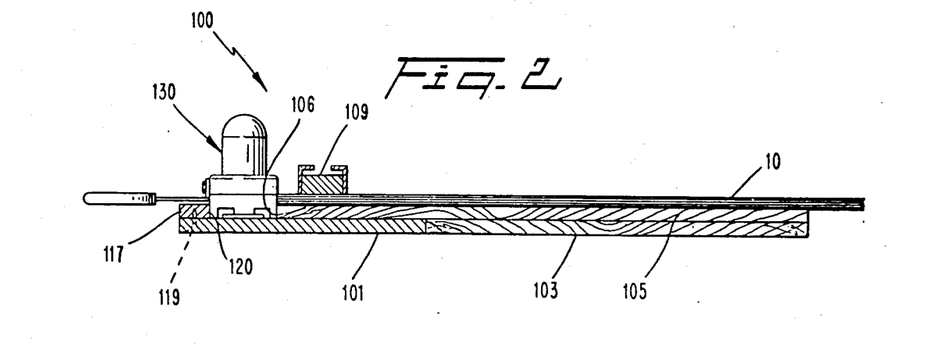
FIG. 2 shows a side view of the apparatus and belt as shown in FIG. 1.

Firstly, reference is made to FIGS. 1 and 2 which show top and side views, respectively, of a jig 100. The jig 100 is composed of a pair of substantially co-planar base plates 101 and 103 and a further base plate 105 which overlies the base plates 101 and 103 as best seen with reference to FIG. 2. In the preferred embodiment, the belt 10 is adapted to overlie the top base plate 105 which then overlies the base plates 101 and 103. As best seen in FIG. 1, the base plate 101 includes at each lateral end thereof a plurality of holes 107. These holes 107 are provided so as to enable the releasable attachment thereto of a clamping member 109 designed to clamp the belt 10 between the clamping member 109 and the base plate 105. For this purpose, the clamping member 109 includes ends 111 thereof which extend laterally of the base plate 105 and each of which includes a respective hole 113 alignable with one of the holes 107. A bolt 115 may be inserted through each hole 113 and thence through one of the holes 107 and may be thereafter fixedly retained therein either by virtue of threading of the holes 107 or alternatively through the provision of a nut (not shown) which may be threaded underneath the base plate 101 over each respective bolt 115. As best seen with reference to figuer 2, the clamping member 109 clamps the belt 10 in the fixed position with regard to the base plates 101, 103 and 105.

With further reference to FIGS. 1 and 2, it is seen that the base plate 101 has fixedly attached thereto a guide bar 117 which is rigidly attached to the base plate 101 by screws 119. As best seen in FIG. 1, the end of the base plate 105 nearest the guide bar 117 is at an acute angle with respect to the longitudinal axis 15 of the belt 10 and similarly, the end of the base plate 101 on which the guide bar 117 is mounted in parallel relationship therewith is at the same acute angle which corresponds to the angle α discussed hereinabove with reference to FIGS. 3 and 4.

Thus, between the terminating edge 106 of the base plate 105 and the inner surface 120 of the guide bar 117, a space is formed which is designated by reference numeral 121, the significance of which will be described in greater detail hereinafter. As shown in FIG. 1, the base plate 105 is made of a generally triangular form having a length dimension x, a width dimension y, and a hypotenuse z. The jig is particularly designed in the embodiment shown so that the width dimension y is approximately twice the length dimension x. This is done so that one skilled in the art contemplating using the present invention may easily construct a jig by constructing a right triangle having perpendicular sides one of which is twice the length of the other and connecting them with a hypotenuse to form a right triangle. When such a jig is constructed, the angle α between the sides x and z thereof will be approximately 63.43°. While it is a preferred aspect of the present invention to make the angle α an acute angle for the reasons set forth hereinabove, especially in light of the resultant gradual rolling of the belt splice over the pulley, any acute angle α would be equally effective as the angle α 63.43° which has been disclosed as a preferred angle herein. Again, this angle has only been chosen as being the angle which results when a jig is formed of a right triangle having perpendicular sides one of which is twice the dimension of the other. In another aspect of the jig 100 in the preferred embodiment, the width dimension 6 is intended to generally correspond with the width of the belt 10.

Figures 3, 4:
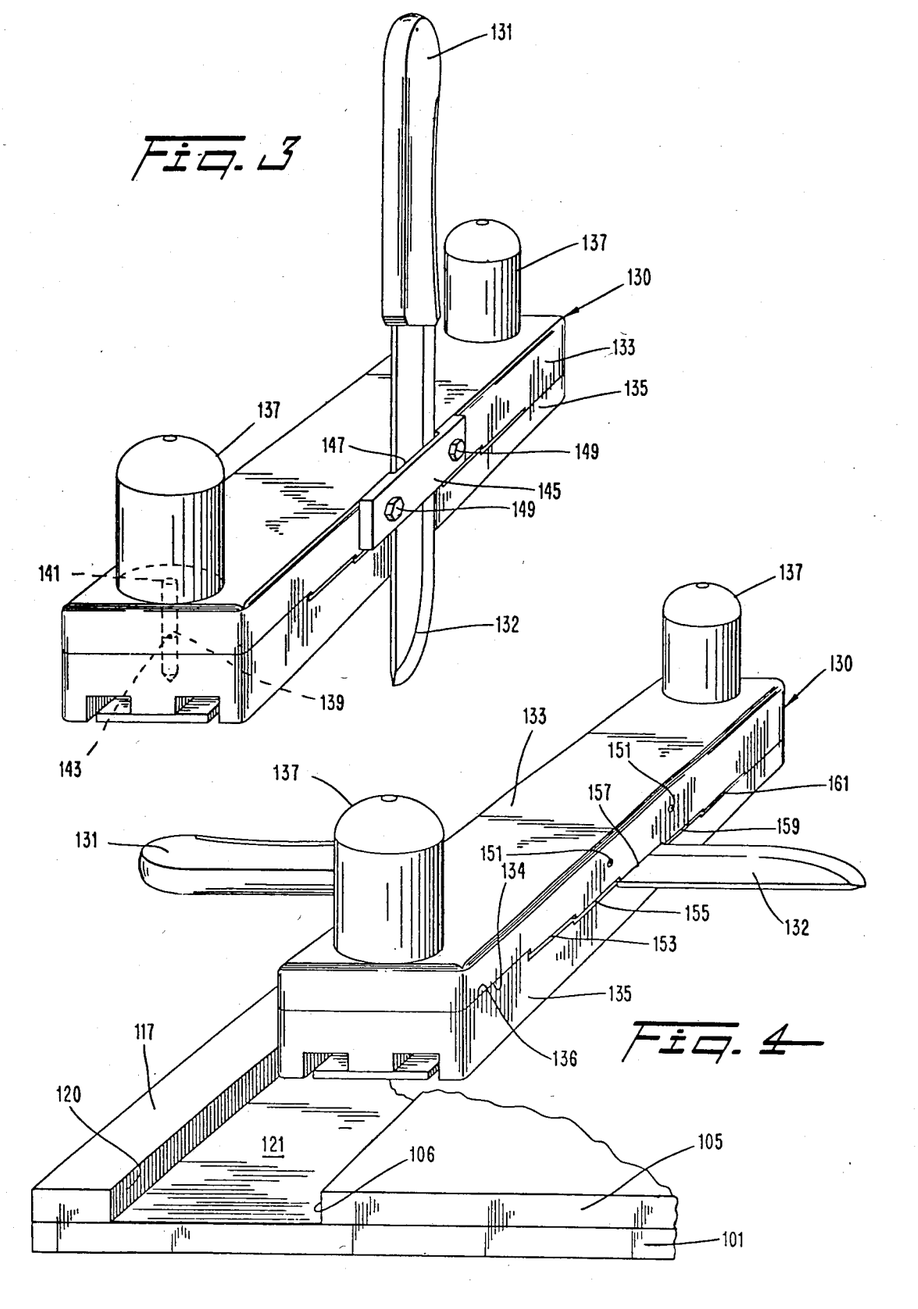
FIG. 3 shows a perspective view of a sliding knife holder forming a part of the jig of the present invention and having a knife clamped thereto in the process enabling the slicing off of the end of a conveyor belt.
FIG. 4 shows a perspective view of the sliding knife holder shown in FIG. 3 but with the knife clamped thereto in a position enabling the slitting of the conveyor belt in a direction along the longitudinal axis thereof.

As further shown with reference to FIGS. 1 and 2, the space 121 is provided so that a sliding knife holder 130 may be controllably guided therein. This sliding knife holder 130 is provided to guide the knife 131 in both slicing the belt at the splice area and splitting the belt between the appropriate plies thereof as discussed hereinabove with the particular reference to FIGS. 5 and 6. FIGS. 3 and 4 show with greater particularity the details of the sliding knife holder 130. Reference is first made to FIG. 3 which shows the sliding knife holder 130 clamping the knife 131 in a position in which it is able to slice off the end of the belt 10 at the correct angle. As shown, the sliding knife holder 130 includes top and bottom plates 133 and 135 which are clamped together through the provision of handles 137 having bolts 139 extending therefrom which bolts 139 extend through respective holes 141 in the top plate 133 and thence thread into threaded holes 143 formed in the lower plate 135. As shown in FIG. 3, in the preferred embodiment, the top plate 133 is provided on one side thereof with a clamping bar 145 having a slot 147 thereof being narrower in thickness than the thickness of the blade of the knife 141. The clamping bar 145 is clamped to the top plate 133 by bolts 149 which may be threaded into holes 151 (FIG. 4).

With the knife 131 attached to the sliding knife holder 130 as shown in FIG. 3, the sliding knife holder 130 may be controllably moved along the space 121 best seen in FIG. 1 to guide the knife blade in slicing off the end of the belt 10.

After the belt 10 has been sliced in the manner described hereinabove, the bolts 149 and clamping bar 145 may be removed from the top plate 133 and with reference to FIG. 4, the knife may be inserted between the plates 133 and 135 so as to enable the splitting of the belt 10 along the longitudinal axis thereof.

As shown in FIG. 4, the plates 133 and 135 have respective facing surfaces 134 and 136 which are stepped to define stepped interfaces 153, 155, 157, 159 and 161. The interfaces are specifically designed so as to support the blade of the knife 131 at different elevations with respect to the vertical position of the belt 10. Thus, the interfaces 153-161 allow adjustability of the elevation of the blade of the knife 131 with respect to the belt 10 to thereby enable belts of differing ply configurations and of differing thicknesses to be sliced either between the middle plies thereof (in the case of an even plyed belt) or between the middle ply and the ply immediately therebelow (as in the case of a belt with odd numbers of plies). Thus, the handles 137 may be loosened so as to allow the blade of the knife 131 to be inserted into the interface which corresponds to the vertical elevation of the particular location in the belt where the longitudinal slicing operation is to be performed. As shown in FIG. 4, the blade of the knife 131 which is designated by reference numeral 132 has been placed in the interface 157 so as to align the blade 132 with a particular elevation between the predetermined plies of the belt 10 (not shown in FIG. 4). After the blade 132 has been inserted into the appropriate interface, the handles 137 may be tightened so as to clamp the plates 133 and 135 together rigidly about the blade 132 with the blade 132 protruding through the sliding knife holder 130 a distance which is predetermined based upon the required depth of slice into the belt 10.

With the knife 131 positioned as shown in FIG. 4, the sliding knife holder 130 may be controllably slid along the space 121 between the surfaces 106 and 120 so as to slice the belt 10 in a predetermined fashion.

It is further noted with reference to FIGS. 1 and 4 that the surface 106 defining the terminus of the base plate 105 defines the location where the belt 10 will be sliced and acts as a guide for the knife in so slicing the belt when the knife 131 is installed on the sliding knife holder 130 as shown in FIG. 3. After the belt 10 has been sliced as best seen in FIG. 1, the portion of the belt 10 which is to be spliced to the portion which has just been cut may then be cut utilizing the jig 100 and sliding knife holder 130. In so doing, the other portion of the belt is installed in the jig 100 in precisely the same manner that the formerly sliced portion had previously been installed and in utilizing the sliding knife holder in the orientation shown in FIG. 4, the same interface as was previously used is also employed for the second longitudinal slice.

Now, with the actual details of both the splice and the jig having been described in great detail, the method of splicing a belt will now be described in great detail with reference being made throughout to FIGS. 1–10.

A conveyor belt which is to be spliced in accordance with the teachings of the present invention consists of an elongated construction preferably made of rubber or other similar material and having two ends. The first step which must be undertaken in practicing the teachings of the present invention is to slice off one of the ends of the belt at the appropriate angle with respect to the longitudinal axis thereof. Thus, the first belt end is rigidly fixed to the jig 100 by loosening the bolts 115, removing the clamping member 109 from the base plate 101, placing the belt over the base plate 105 with the longitudinal axis thereof being substantially parallel to the side x of the base plate 105 and thereafter placing the clamping member 109 over the belt and bolting the clamping member 109 to the base plate 101 through the use of the bolts 115. During this operation care is taken to ensure that the surface 106 of the base plate 105 is completely covered by the end of the bolt.

With the belt so clamped to the jig 100, the sliding knife holder 130 is prepared to slice off the end of the belt by having the knife blade 132 thereof mounted under the clamping bar 145 as best seen in FIG. 3. The extent to which the blade 132 protrudes below the clamping bar 145 will be determined based upon the thickness of the particular belt which is being spliced. Thereafter, the sliding knife holder is slid along the space 121 from one end thereof to the other end thereof which maintaining the sliding knife holder 130 securely within the space 121 so that the blade 132 acts to slice the end of the belt off precisely along the surface 106 of the base plate 105.

After the end of the belt has been so sliced, the knife 131 is removed from the clamping bar 145 and, with reference to FIG. 4, on eo fthe interfaces 153, 155, 157, 159 or 161 is chosen for insertion therethrough of the knife blade 132 with the particular interface being chosen based upon the particular construction of the particular belt, most importantly based upon the elevation of the location between the appropriate plies where a longitudinal slice is required. Thereafter, the handles 137 are loosened, the blade 132 of the knife 131 is inserted through the appropriate interface and the handles 137 are thereafter tightened so as to firmly attach the knife 131 to the sliding knife holder 130. It is noted that the extent to which the knife blade 132 has extended through the plates 133 and 135 at the particular interface chosen is predetermined based upon the longitudinal extent to which it is desired to split the belt end.

With the knife 131 attached to the sliding knife holder 130 as shown in FIG. 4, the sliding knife holder 130 is then engaged into the space 121 as shown in FIG. 1 and is thereafter slid across the entire extent of the space 121 from one end to another so that the belt end is split at precisely the elevation desired and between the plies which are chosen in accordance with the factors discussed hereinabove with regard to the specific description of FIGS. 7 and 8. Thereafter, the sliding knife holder 130 may be removed from the space 121 and the belt may be removed from the jig 100 by loosening of the clamping member 109 from the base plate 101.

The first end of the belt having been precisely prepared for the splice, the second end of the belt is inserted into the jig 100 as explained hereinabove and the end thereof is sliced off and a split is formed therein in accordance with the method steps discused hereinabove concerning the first belt end. after both belt ends have been prepared for the slice as discussed hereinabove, if desired, the top and bottom layers of the belt at each end thereof may be removed so as to allow the replacement of the removed materials with fresh rubber splines as shown in FIGS. 7 and 8 and discussed hereinabove in the specific description of FIGS. 7 and 8.

If this optional procedure has been followed, then the next step is to insert the strings 23 and 25 at the deepest penetrations of the longitudinal slits in the belt ends for the reasons set forth hereinabove regarding the discussions of FIG. 5, namely to facilitate the dispersion of vapors created during the vulcanization procedure.

Thereafter, the splice piece 21 is inserted into the slit in the belt ends and the belt ends are engaged with one another as specifically shown in FIGS. 7 and 8 at the interfaces 11 and 13. As described hereinabove, the splice piece may be of a single ply with the wire cables thereof running parallel to one another and being embedded in a rubber pad as shown in FIGS. 9 and 10, of, alternatively, may be made of a 2, 3 or greater number ply construction wherein the wire cables are angled with respect to one another in the manner shown in FIG. 6 with the cables being equally angled to either side of the longitudinal axis 15 of the belt so that they will most effectively resist longitudinal stretching of the belt 10 after splicing. It is further noted that if desired, the splice piece and slit surfaces may be coated with a suitable rubber cement and may be allowed to dry prior to the insertion of the splice piece to enhance the strength of the eventual splice.

If the above described optional procedure has been followed, to wit, the removing of the top and bottom layers of rubber from the belt ends, the openings defined by these removed layers may then have inserted therein strips of open weave fabric which are referred to in FIG. 5 with the reference numerals 27 and 29, and, thereafter, fresh strips of rubber may be inserted over the open weave fabric strips as shown in FIGS. 7 and 8 and designated by reference numerals 12 and 14.

At this point, the belt is ready for vulcanization. The vulcanization can be undertaken in any conventional manner, for example, through the use of steam or electrical heat to about 310° F. and at a pressure between the press heads of at least 100 p.s.i.

Accordingly, a splice and a method of splicing a belt have been disclosed hereinabove which are believed to be far superior to prior art splices and methods when ease of splicing, expense and strength of splice are considered. It must be stressed, however, that various modifications, alterations, and changes in the present invention may be contemplated by those skilled in the art without departing from the intended scope thereof. Accordingly, it is stressed that the preent invention is only intended to be limited by the terms of the following claims.

I claim:

1. A jig for cutting a belt end in a splicing procedure comprising:
   (a) base plate means for supporting said belt thereon;
   (b) clamping means for clamping said belt to said base plate means;
   (c) guide means on said base plate means;
   (d) holding means slidably mounted in said guide means, said holding means comprising;
      (1) a top plate having a top surface and a bottom surface;
      (2) a bottom plate having a top surface and a bottom surface; and
      (3) said top surface of said bottom plate and said bottom surface of said top plate facing one another at an interface defining a stepped configuration comprising a plurality of steps from one lateral side of said plate to another lateral side thereof; and
   (e) cutting means mountable on said holding means, said holding means being slidably movable in said guide means whereby said cutting means may cut said belt.

2. The jig of claim 1, wherein said base plate means comprises a first base plate having an upstanding bar forming a portion of said guide means and a second base plate overlying said first base plate, a termination of said second base plate facing said upstanding bar and forming a further portion of said guide means.

3. The jig of claim 2, wherein said holding means is slidably mounted between said upstanding bar and said termination.

4. The jig of claim 3, wherein said termination defines a surface engageable with said cutting means to guide the cutting of said belt.

5. The jig of claim 1, wherein said holding means further includes a clamping bar releasably attached thereto on a surface substantially perpendicular to said steps, said clamping bar being adapted to releasably clamp a cutting means to said holding means, said cutting means comprising a knife.

6. The jig of claim 1, wherein said holding means further includes handle means extending through said top plate and releasably connecting said top and bottom plates.

7. The jig of claim 6, wherein said cutting means comprises a knife insertable through said interface a predetermined extent and clampable therein by tightening of said handle means, said knife being selectively insertable through any of said steps.

8. A jig for cutting a belt end in a splicing procedure comprising:
   (a) base plate means for supporting said belt thereon;
   (b) clamping means for clamping said belt to said base plate means;
   (c) guide means on said base plate means;
   (d) holding means slidably mounted in said guide means; and
   (e) cutting means mountable on said holding means, said holding means being slidably movable in said guide means whereby said cutting means may cut said belt;
   (f) said holding means comprising a first clamp means for holding said cutting means in a first orientation allowing trimming of said belt end, and second clamping means for holding said cutting means in a second orientation substantially perpendicular to said first orientation, whereby when said holding means is slidably moved in said guide means with said cutting means in said second orientation, said cutting means is operative to split said belt end in a direction substantially parallel to a longitudinal extent of said belt.

* * * * *